(12) United States Patent
Chu et al.

(10) Patent No.: US 8,842,575 B2
(45) Date of Patent: Sep. 23, 2014

(54) METHOD AND APPARATUS FOR PROVIDING A NON-OVERLAPPING RING-MESH NETWORK TOPOLOGY

(75) Inventors: Thomas P. Chu, Englishtown, NJ (US); Ahmet Akyamac, Bridgewater, NJ (US); Huseyin Uzunalioglu, Millington, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 97 days.

(21) Appl. No.: 13/528,889

(22) Filed: Jun. 21, 2012

(65) Prior Publication Data

US 2013/0343224 A1 Dec. 26, 2013

(51) Int. Cl.
*H04L 12/28* (2006.01)
*H04L 12/56* (2006.01)

(52) U.S. Cl.
USPC ........... 370/254; 370/408; 370/216; 370/217; 370/218; 370/219; 370/220; 370/221; 370/222; 370/223; 370/224; 370/225; 370/226; 370/227; 370/228

(58) Field of Classification Search
USPC .................................. 370/254, 216–228, 408
See application file for complete search history.

(56) References Cited

U.S. PATENT DOCUMENTS

| | | | | |
|---|---|---|---|---|
| 4,875,207 A * | 10/1989 | Van Twist et al. | ............ | 370/406 |
| 2006/0062211 A1 * | 3/2006 | Manthoulis et al. | .......... | 370/386 |
| 2006/0072505 A1 * | 4/2006 | Carrillo et al. | ................. | 370/331 |
| 2007/0195716 A1 * | 8/2007 | Richter | .......................... | 370/258 |
| 2008/0080367 A1 * | 4/2008 | Fujii et al. | ..................... | 370/223 |
| 2010/0153157 A1 * | 6/2010 | Wade et al. | ........................ | 705/8 |
| 2011/0176804 A1 * | 7/2011 | Blinkert et al. | .................. | 398/45 |
| 2011/0228705 A1 * | 9/2011 | Aguirre et al. | ................ | 370/254 |

FOREIGN PATENT DOCUMENTS

EP          0 234 618 A1       9/1987

OTHER PUBLICATIONS

PCT International Search Report, dated Aug. 8, 2013 (PCT/US2013/042125) 4 pages.
Parhami, Behrooz, "Periodically Regular Chordal Ring Networks for Massively Parallel Architectures", Frontiers of Massively Parallel Computation, 1995. Proceedings. Fronti ers '95., Fifth Symposium on the McLean, VA, USA Feb. 6-9, 1995, Los Alamitos, CA, USA. IEEE Comput. Soc, Feb. 6, 1995, pp. 315-322.
Browne, R.F:"The Embedding of Meshes and Trees Into Degree Four Chordal Ring Networks", Computer Journal, Oxford University Press, Surrey, GB, vol. 38, No. 1, Jan. 1, 1995, pp. 71-77, XP000518613, ISSN: 0010-4620 sections 3 and 4.
Singla, A. et al: "Jellyfish: Networking Data Centers Randomly", arXiv:1110.1687v2 [cs.NI] Oct. 12, 2011, 14 pages, available online at: http://www.cs.cornell.edu/courses/cs6452/2012sp/papers/jellyfish-nsdi12.pdf; University of Illinois-Champaign, University of California, Berkeley; *Part of this work was published at HotCloud 11 [36].

* cited by examiner

*Primary Examiner* — Edan Orgad
*Assistant Examiner* — Rebecca Song
(74) *Attorney, Agent, or Firm* — C. Bilicska (57) ABSTRACT

Various embodiments provide a method and apparatus of providing a non-overlapping ring-mesh network topology which reduces costs (e.g., the number of network links) while providing resiliency to failure and meeting QoS requirements (e.g., network delay attributed to traversing the network architecture). In particular, a set of target nodes belonging to a cluster are connected through N rings. Each node is member of all N rings and no link between nodes in a ring is duplicated in another ring.

20 Claims, 9 Drawing Sheets

| # of nodes | Super cluster (1 to 2 hops) | | Switch Cluster (1 to 3 hops) | |
|---|---|---|---|---|
| | # of connectors at a node | # of network links | # of connectors at a node | # of network links |
| 16 | 6 | 48 | 4 | 32 |
| 25 | 8 | 100 | 6 | 75 |
| 36 | 10 | 180 | 6 | 108 |
| 49 | 12 | 294 | 8 | 196 |
| 64 | 14 | 448 | 8 | 256 |
| 100 | 18 | 900 | 10 | 500 |
| 256 | 30 | 3840 | 16 | 2048 |

Potential Constructions of a 64 Node Network arranged in 4 non-overlapping Rings (Redacted)

| Seed | NumRings | MinHops | MaxHops | AvgHops | 1Hops | 2Hops | 3Hops | 4Hops | >4Hops | 4Hops-Pct |
|---|---|---|---|---|---|---|---|---|---|---|
| 13208074 | 4 | 1 | 3 | 2.16 | 256 | 1180 | 580 | 0 | 0 | 0.00% |
| 13176574 | 4 | 1 | 3 | 2.16 | 256 | 1175 | 585 | 0 | 0 | 0.00% |
| 13220178 | 4 | 1 | 3 | 2.16 | 256 | 1179 | 581 | 0 | 0 | 0.00% |
| 13220353 | 4 | 1 | 3 | 2.16 | 256 | 1180 | 580 | 0 | 0 | 0.00% |
| *** 993 Computer Iterations Deleted for Clarity *** | | | | | | | | | | |
| 13230154 | 4 | 1 | 4 | 2.21 | 256 | 1080 | 678 | 2 | 2 | 0.10% |
| 13185758 | 4 | 1 | 4 | 2.21 | 256 | 1080 | 678 | 2 | 2 | 0.10% |
| 13235388 | 4 | 1 | 4 | 2.22 | 256 | 1071 | 688 | 1 | 0 | 0.05% |

FIG. 3B

Potential Constructions of a 80 Node Network arranged in 4 non-overlapping Rings (Redacted)

| Seed | NumRings | MinHops | MaxHops | AvgHops | 1Hops | 2Hops | 3Hops | 4Hops | >4Hops | 4Hops-Pct |
|---|---|---|---|---|---|---|---|---|---|---|
| 181670 | 4 | 1 | 4 | 2.28 | 320 | 1627 | 1211 | 2 | 0 | 0.06% |
| 355983 | 4 | 1 | 4 | 2.28 | 320 | 1628 | 1210 | 2 | 0 | 0.06% |
| 330580 | 4 | 1 | 4 | 2.28 | 320 | 1636 | 1203 | 1 | 0 | 0.03% |
| 744670 | 4 | 1 | 4 | 2.29 | 320 | 1596 | 1236 | 8 | 0 | 0.25% |
| *** 993 Computer Iterations Deleted for Clarity *** | | | | | | | | | | |
| 337213 | 4 | 1 | 4 | 2.32 | 320 | 1523 | 1316 | 1 | 0 | 0.03% |
| 172647 | 4 | 1 | 4 | 2.33 | 320 | 1493 | 1332 | 15 | 0 | 0.47% |
| 368664 | 4 | 1 | 4 | 2.33 | 320 | 1497 | 1334 | 9 | 0 | 0.28% |

METHOD AND APPARATUS FOR PROVIDING A NON-OVERLAPPING RING-MESH NETWORK TOPOLOGY

TECHNICAL FIELD

The invention relates generally to methods and apparatus for providing a switch cluster network architecture.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known network topologies, nodes may be arranged in a bus topology where a common backbone connects all of the nodes. In other known network topologies, nodes may be arranged in a ring topology where each node in a chain has two neighbors and the last node connects back to the first node. In still other known network topologies, nodes may be arranged in a star topology where each of the child nodes connect directly back to one parent node. In still other known network topologies, nodes may be arranged in a tree topology where a root node spawns one or more levels of nodes and each child node on a lower level connects directly to their parent at a higher level of the tree. In still other known network topologies, nodes may be arranged in a mesh topology where one or more of the nodes connect to one or more of the other nodes providing a plurality of paths through the network.

SUMMARY

Various embodiments provide a method and apparatus of providing a non-overlapping ring-mesh network topology which reduces costs (e.g., the number of network links) while providing resiliency to failure and meeting QoS requirements (e.g., network delay attributed to traversing the network architecture).

In one embodiment, an apparatus is provided for providing a switch cluster. The apparatus includes a data storage and a processor communicatively connected to the data storage. The processor is programmed to: determine a set of target nodes; determine a ring count; and determine a network architecture based on the set of target nodes and the ring count, the network architecture comprises the set of target nodes communicatively connected to form a plurality of non-overlapping rings equal to the ring count.

In some of the above embodiments, the ring count is based on a number of members in the set of target nodes.

In some of the above embodiments, the ring count is based on a performance metric.

In some of the above embodiments, the determination of the network architecture includes programming the processor to: determine a plurality of candidate network architectures based on the set of target nodes and the ring count; and select one of the plurality of candidate network architectures as the network architecture based on a performance metric.

In some of the above embodiments, the performance metric is at least one of an average hop count and a maximum hop-count.

In some of the above embodiments, the determination of the network architecture includes programming the processor to: construct a new non-overlapping ring based on at least one other non-overlapping ring. Wherein the plurality of non-overlapping rings comprises the new non-overlapping ring and the at least one other non-overlapping ring.

In some of the above embodiments, the construction of the new non-overlapping ring includes programming the processor to: initialize a partial non-overlapping ring with a first of the target nodes; append a second of the target nodes to the partial non-overlapping ring based on a determination that the connection between the second target node and the neighbor target nodes of the second target node in the partial non-overlapping ring is not duplicated in the at least one other non-overlapping ring; and insert a third of the target nodes to the partial non-overlapping ring based on a determination that the connection between the third target node and the neighbor target nodes of the third target node in the partial non-overlapping ring is not duplicated in the at least one other non-overlapping ring.

In some of the above embodiments, the second target node is selected randomly from a subset of the target nodes, the subset comprising the members of the target nodes that are not in the partial non-overlapping ring such that connections with the first node and the last node in the partial non-overlapping ring are not duplicated in the at least one other non-overlapping ring.

In some of the above embodiments, the insertion of the third target node is based on a determination that none of the target nodes remaining to be added to the partial non-overlapping ring may be appended to the partial non-overlapping ring.

In some of the above embodiments, the determination of the network architecture is further based on at least one of a customer service level agreement or a quality of service constraint.

In a second embodiment, a switching system for switching data is provided. The system includes a switch cluster including a plurality of nodes communicatively connected to form a plurality of non-overlapping rings.

In some of the above embodiments, the switch cluster provides substantially a 3-hop network.

In some of the above embodiments, the system further includes: a second switch cluster communicatively connected to the switch cluster. The second switch cluster includes a second plurality of nodes communicatively connected to form a second plurality of non-overlapping rings.

In some of the above embodiments, the system further includes: a second switch cluster communicatively connected to the switch cluster. The second switch cluster includes a second plurality of nodes communicatively connected to form a full mesh topology.

In some of the above embodiments, the system further includes a second switch cluster including a second plurality of nodes communicatively connected to form a second plurality of non-overlapping rings. Wherein the switch cluster and the second plurality of nodes are arranged in a tree topology.

In a third embodiment, a method is provided for providing a switch cluster. The method includes: determining a set of target nodes; determining a ring count; and determining a network architecture based on the set of target nodes and the ring count, the network architecture comprises the set of target nodes communicatively connected to form a plurality of non-overlapping rings equal to the ring count.

In some of the above embodiments, the method further includes adding a new ring to the network architecture based on a network growth threshold.

In some of the above embodiments, the step of adding the new ring comprises redirecting a port on a first of the target nodes to communicatively connect the first target node with a second of the target nodes.

In some of the above embodiments, the ring count is based on a performance metric.

In some of the above embodiments, the step of determining of the network architecture includes: constructing a new non-overlapping ring based on at least one other non-overlapping ring. Wherein the plurality of non-overlapping rings comprises the new non-overlapping ring and the at least one other non-overlapping ring.

In some of the above embodiments, the determination of the network architecture is further based on at least one of a customer service level agreement or a quality of service constraint.

BRIEF DESCRIPTION OF THE DRAWINGS

Various embodiments are illustrated in the accompanying drawings, in which.

To facilitate understanding, identical reference numerals have been used to designate elements having substantially the same or similar structure or substantially the same or similar function.

DETAILED DESCRIPTION OF ILLUSTRATIVE EMBODIMENTS

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

Various embodiments provide a method and apparatus of providing a non-overlapping ring-mesh network topology which reduces costs (e.g., the number of network links) while providing resiliency to failure and meeting QoS requirements (e.g., network delay attributed to traversing the network architecture). In particular, a set of target nodes belonging to a cluster are connected through N rings. Each node is member of all N rings and no link between nodes in a ring is duplicated in another ring. Advantageously, the non-overlapping ring-mesh topology requires a decreased number of connectors at each node and total network connections in order to provide the resiliency to failure, high connectivity and comparable hop count of the shortest path between two nodes of other known network topologies such as mesh and cluster topologies.

Though description and drawings illustrate embodiments of the non-overlapping ring-mesh topology in a switch cluster in a data center, it will be appreciated that the non-overlapping ring-mesh topology may be used to provide connectivity between nodes in any suitable network.

Figure 1:
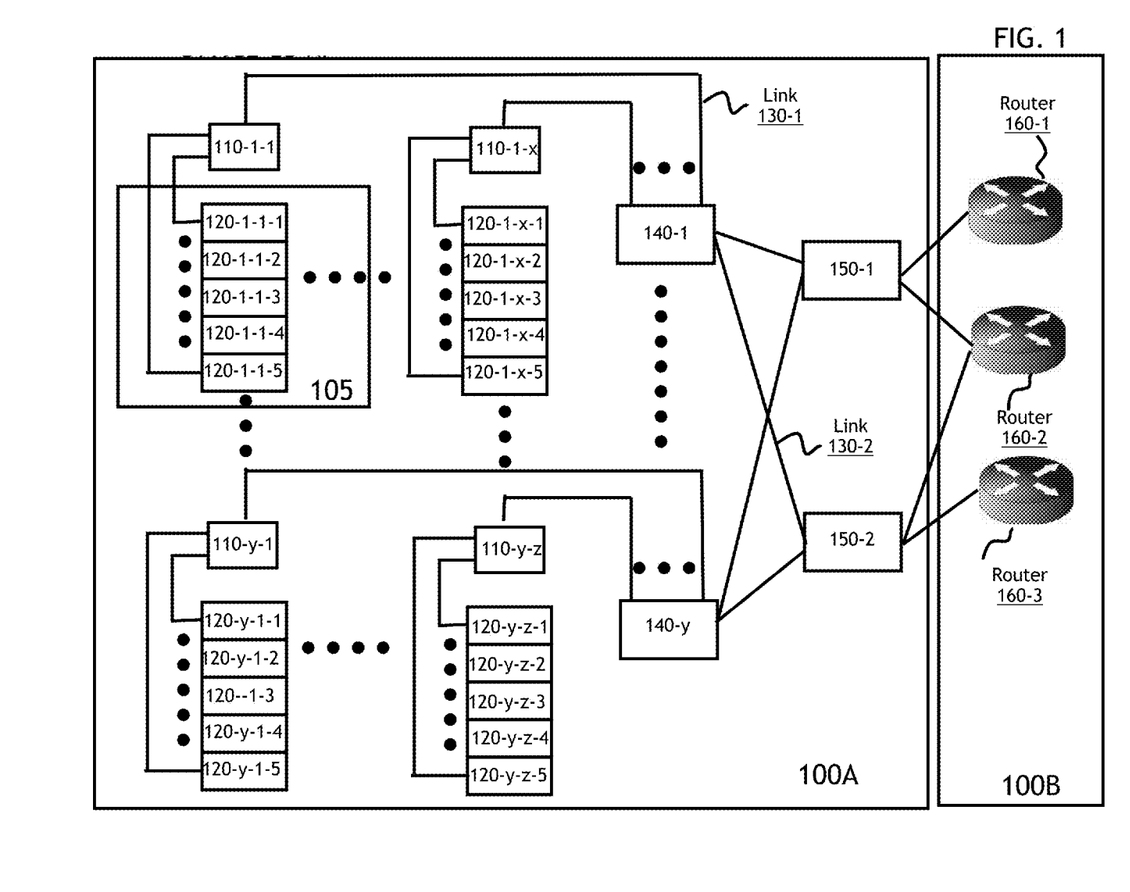
FIG. 1 illustrates an embodiment of a data center network architecture 100A including an exemplary data center 100A and a network 100B.

FIG. 1 illustrates an embodiment of a data center network architecture 100A including an exemplary data center 100A and a network 1008. The data center 100A includes the resources 120-1-1-1-120-y-z-5 (collectively, resources 120). Resources 120 are arranged in "y" rows, where each row contains a number (e.g., illustratively "x" or "y") of racks of resources (e.g., rack 105) that are accessed through a communication path. The communication path communicatively connects resources 120 with network 100B via an appropriate one of the top of the rack switches 110-1-1-110-y-z (collectively, TOR switches 110), an appropriate one of the end of the row switches 140-1-140-n (collectively, EOR switches 140), an appropriate one of the layer 2 aggregation switches 150-1-150-n (collectively, aggregation switches 150) and appropriate links 130-1-130-2 (collectively, links 130) (remaining link labels have been omitted for the purpose of clarity). Communication between data center 100A and network 1008 is via one of aggregation switches 150, an appropriate one of routers 160-1-160-3 (collectively, routers 160), and appropriate links 130. It should be appreciated that a data center may be architected in any suitable configuration and that data center 100A is just one exemplary architecture being used for illustrative purposes. For example, the communication path may include any suitable configuration of devices (e.g., switches, routers, hubs, and the like) to switch data between the resources 120 and network 1008.

TOR switches 110 switch data between resources in an associated rack and an appropriate EOR switch. For example, TOR switch 110-1-1 switches data from resources in rack 105 to network 1008 via an appropriate EOR switch (e.g., EOR switch 140-1).

Resources 120 may be any suitable device such as processors, memory, storage or networking. It should be appreciated that while 5 resources are illustrated in each rack (e.g., rack 105), each rack may include fewer or more resources and that each rack may contain different types or numbers of resources. In some embodiments, an application may be supported by multiple component instances such as virtual machines (VMs) or virtualized storage. These component instances may include varied resources connected within the data center network architecture 100A.

As illustrated, each resource 120 is labeled using a row-column-resource number nomenclature. For example, resource 120-2-3-4 would be the fourth resource in the rack residing in the second row and third column.

EOR switches 140 switch data between an associated TOR switch and an appropriate aggregation switch. For example, EOR switch 140-1 switches data from TOR switches 110-1-1-210-1-*x* to network 1008 via an appropriate aggregation switch (e.g., aggregation switch 150-1 or 150-2).

Aggregation switches 150 switch data between an associated EOR switch and an appropriate router. For example, TOR switch 110-1-1 switches data from resources in rack 105 to network 1008 via an appropriate EOR switch (e.g., EOR switch 140-1) and an appropriate aggregation switch (e.g., aggregation switch 150-1 or 150-2).

Routers 160 switch data between network 1008 and data center 100A via an appropriate aggregation switch. For example, router 160-1 may switch data from network 1008 to data center 100A via aggregation switch 150-1.

The network 1008 includes any number of access and edge nodes and network devices and any number and configuration of links (not shown for purposes of clarity). Moreover, it should be appreciated that network 1008 may include any combination and any number of wireless, or wire line networks including: LTE, GSM, CDMA, Local Area Network(s) (LAN), Wireless Local Area Network(s) (WLAN), Wide Area Network (WAN), Metropolitan Area Network (MAN), or the like.

In some embodiments, TOR switches 120 or EOR switches 140 are Ethernet switches.

In some embodiments, TOR switches 120 or EOR switches 140 may be arranged to be redundant. For example, rack 105 may be serviced by two or more TOR switches 110.

In some embodiments, aggregation switches 150 are layer 2 Ethernet switches.

Figure 2A:
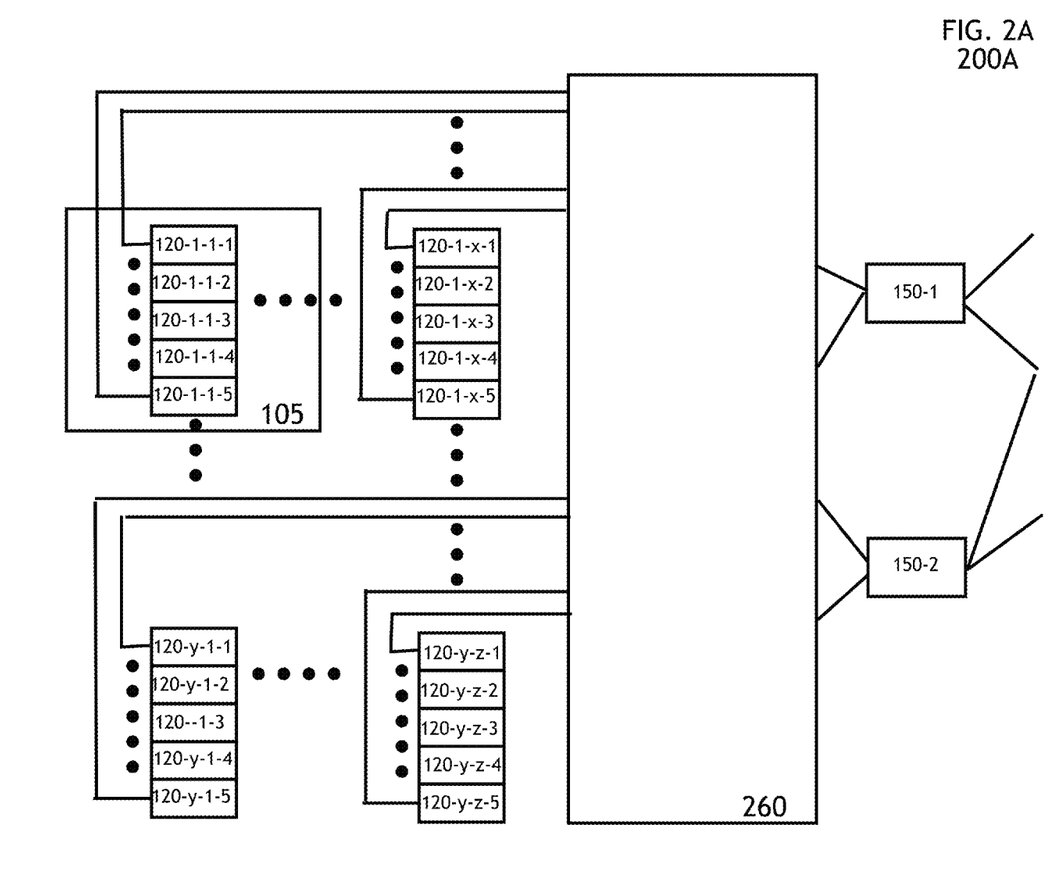
FIG. 2A illustrates a block diagram of an exemplary switch cluster 260 in a flexible data center network architecture 200A

FIG. 2A illustrates a block diagram of an exemplary switch cluster 260 in a flexible data center network architecture 200A. The flexible data center network architecture 200A includes the resources 120 and aggregation switches 150 as described above in FIG. 1. Switch cluster 260 includes a number of target nodes that switch data between resources 120 and aggregation switches 150 as described herein.

It should be appreciated that switch cluster 260 may be architected in any suitable configuration and that switch cluster 260 is just one exemplary architecture being used for illustrative purposes. In some embodiments, switch cluster 260 may include the TOR switches 110 from FIG. 1 (i.e., and not the EOR switches 140 as illustrated in FIG. 2A). In some embodiments, switch cluster 260 may include the EOR switches 140 from FIG. 1.

In some embodiments, the flexible data center network architecture 200A may contain more switch cluster 260*s*. In some of these embodiments, TOR switches or EOR switches may be arranged in a plurality of switch clusters. In some of these embodiments, one or more of the plurality of switch clusters may be designed to support a particular quality of service (QoS) criteria. For example, virtual machines or virtualized storage may be placed in appropriate clusters upon creation depending on their QoS requirements or the location of their peers.

In some embodiments, the switch clusters may be deployed in addition to a conventional network topology such as a tree network topology. Advantageously, a switch cluster arrangement may off-load traffic from the north-south links of the tree network.

Figure 2B:
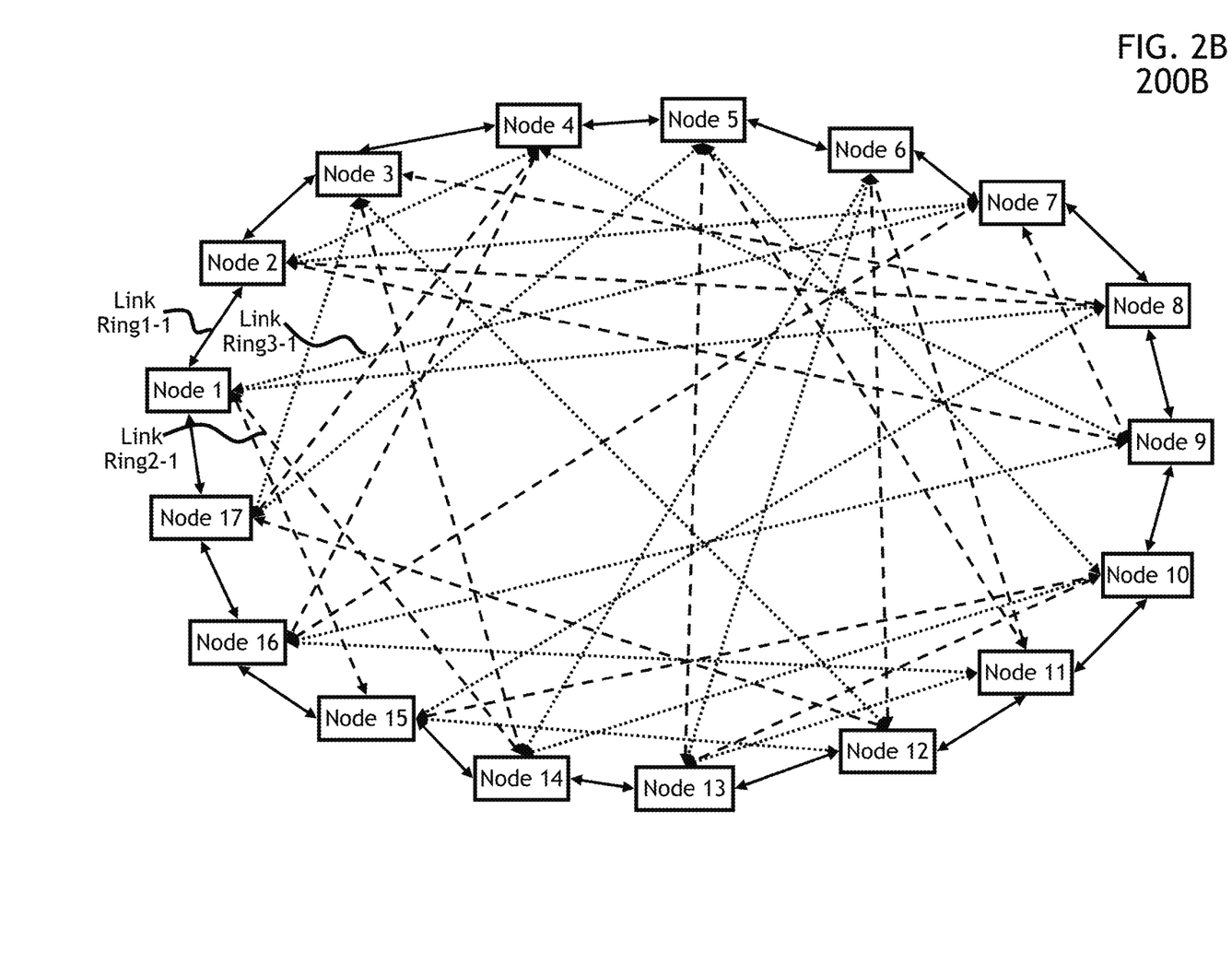
FIG. 2B illustrates a functional block diagram of an exemplary switch cluster 200B that is an embodiment of the switch cluster 260 of FIG. 2A.

FIG. 2B illustrates a functional block diagram of an exemplary switch cluster 200B that is an embodiment of the switch cluster 260 of FIG. 2A. The switch cluster 200B includes a collection of nodes node 1-node 17 (collectively, nodes) interconnected in ring networks Ring1, Ring2 and Ring3 (collectively, rings) via links Link Ring1-1-Link Ring3-1 (collectively, links).

Nodes may include any type or number of suitable switches. In particular, the nodes of switch cluster 200B are connected through N "non-overlapping rings", with each node being a member of all N of the rings. For example, in the embodiment or FIG. 2B, nodes may include a portion or all of the TOR switches 120 or a portion or all of the EOR switches 140. As referred to herein, "non-overlapping rings" means that no link between nodes in a one ring is duplicated in another ring. It should be appreciated that while seventeen (17) nodes are illustrated here, switch cluster 200B may include fewer or more nodes. It should be appreciated that nodes may include connections to components other than target nodes making up the switch cluster. For example, nodes may connect to: (i) resources (e.g., resources 120 of FIG. 2), (ii) aggregation switches (e.g., aggregation switches 150 of FIG. 2), (iii) other switching nodes (e.g., if the TOR switches 110 of FIG. 1 are clustered in a plurality of switch clusters), or (iv) the like.

Links support communicating over one or more communication channels such as: wireless communications (e.g., LTE, GSM, CDMA, bluetooth); femtocell communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, links may be any number or combinations of communication channels.

As illustrated, switch cluster 200B is a 3-hop network including 17 nodes arranged in three (3) "non-overlapping rings". The three rings, Ring1, Ring2 and Ring3 are illustrated using solid links (e.g., Link Ring1-1), dashed links (e.g., Link Ring2-1) and dotted links (e.g., Link Ring3-1) respectively. The "non-overlapping rings" illustrated are:

Ring 1={1, 2, 3, 4, 5, 6, 7, 8, 9, 10, 11, 12, 13, 14, 15, 16, 17}

Ring 2={1, 14, 3, 8, 2, 9, 7, 16, 4, 17, 12, 6, 11, 5, 13, 10, 15}

Ring 3={1, 7, 2, 4, 9, 16, 11, 13, 6, 14, 10, 5, 17, 3, 12, 15, 8}

Where nodes 1-17 are referred to numerically as 1-17 respectively and the notation {n1, n2, n3, n4, . . . , nk} denotes a ring where neighboring nodes are bi-directionally connected and nk is bi-directionally connected back to n1.

Advantageously, connecting the nodes in a non-overlapping ring arrangement provides route diversity, resiliency and high connectivity.

Figure 3A:
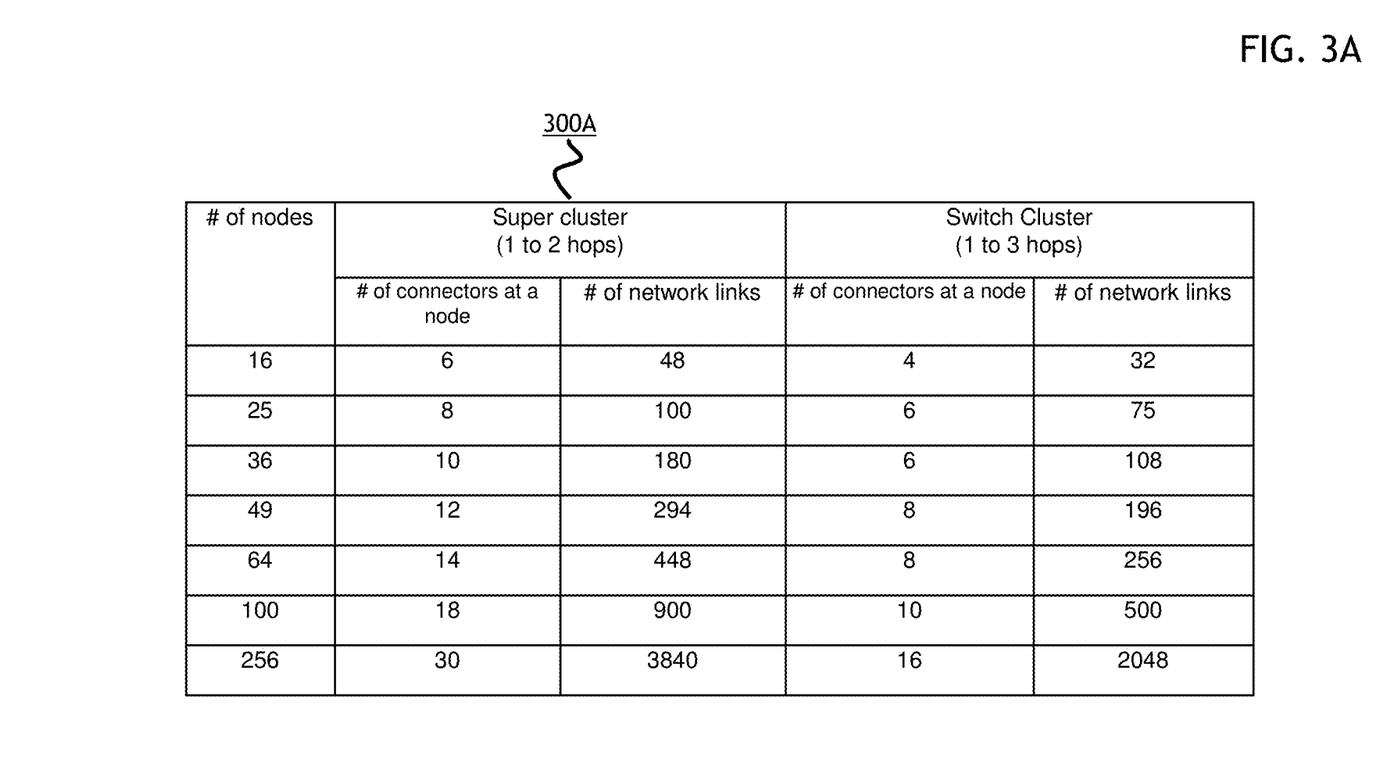
FIG. 3A illustrates a comparison between a super cluster and the switch cluster of the required number of connectors at a node and the number of required network links.

Referring to FIG. 3A, switch cluster 200B advantageously contains fewer connectors at a node and fewer network links than a conventional super cluster arrangement while still providing protection against a single failure (e.g., node or link) and providing comparable throughput (e.g., a comparable hop count).

Figure 3B:
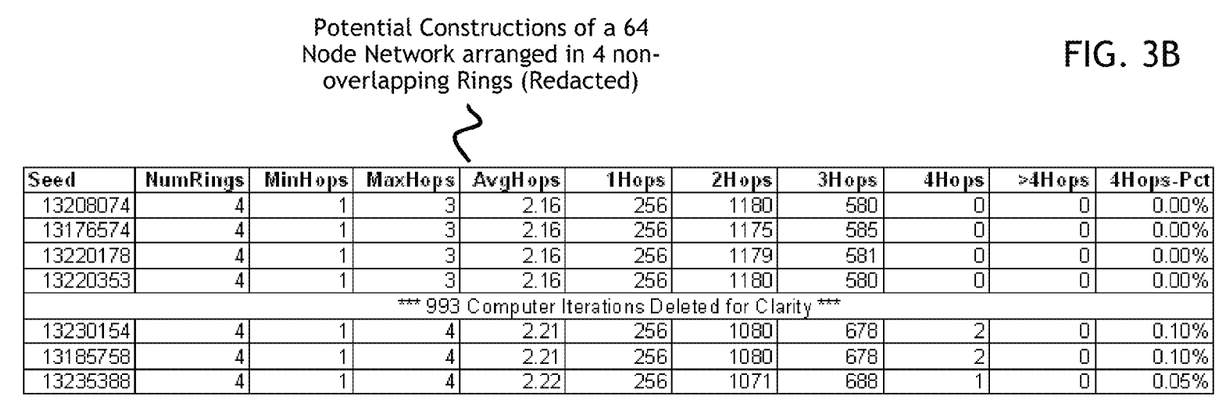
FIG. 3B illustrates redacted data of potential constructions of a 64 node network arranged in 4 non-overlapping rings.
Figure 3C:
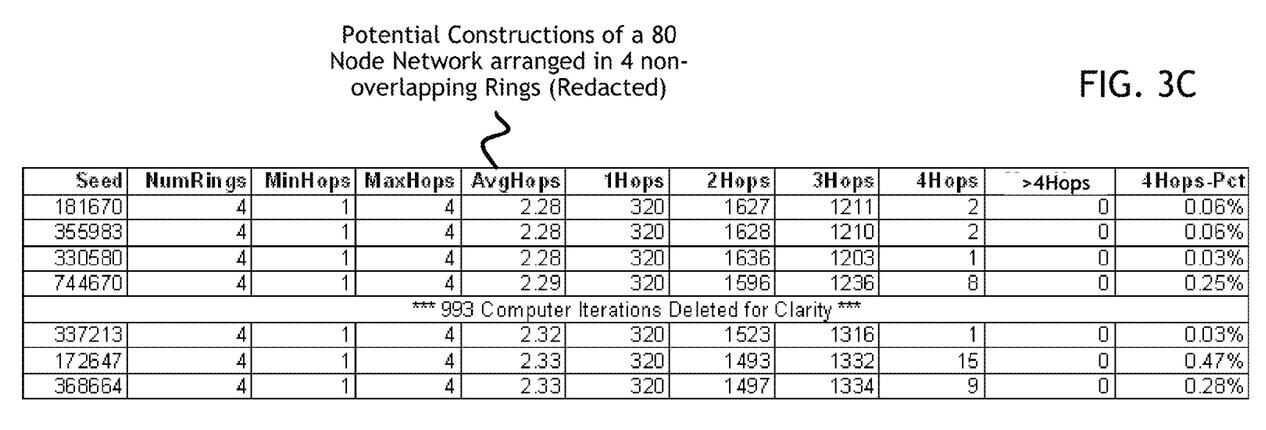
FIG. 3C illustrates redacted data of potential constructions of a 80 node network arranged in 4 non-overlapping rings.

As referred to herein, an "N-hop" network provides N-hop or less connectivity between substantially any combination of nodes in the switch cluster where substantially means greater than ninety nine percent (99%). In other words, constructions of an n-hop switch cluster may include possible switch cluster constructions where communication between one or more of the node pairs requires more than N hops. For example, referring to FIG. 3B, a computer simulation of 1000 potential ring constructions for a 2-hop 64 node network constructed using 4 non-overlapping rings estimated that the percentage of node combinations requiring 4 hops of the total potential node combinations were only in the range from 0.00%-0.15%. In a second example, referring to FIG. 3C, a computer simulation of 1000 potential ring constructions for a 3-hop 80 node network constructed using 4 non-overlapping rings estimated that the percentage of node combinations requiring 4 hops of the total potential node combinations were only in the range from 0.00%-0.47%.

It should be appreciated that while switch cluster 200B is illustrated as a 3 hop-network, switch cluster 200B may be fewer or more hops. In some embodiments, switch cluster 200B is designed based on cost or performance metrics. It should be appreciated that for larger hop size networks the number of connectors at a node and the links in the network will be less (i.e., more cost efficient), however, the performance would be lower.

In some embodiments, the nodes include a routing protocol such as IS-IS (ISO 10589) to determine the topology of the network and use the shortest path between two nodes in forwarding data (e.g., packets).

In some embodiments, a new ring may be added once the network growth has exceeded a threshold (e.g., a number of nodes) so as to maintain the hop count between nodes to meet the established requirements. In some of these embodiments, a maximum number of rings may be set. In these embodiments, a node is configured to support upgrades to the set value of maximum number of rings.

In some embodiments, the node is configured (e.g., a port) to support connectivity to either peer switches or to servers. In some of these embodiments, a port to a server can be redirected to support connectivity to peer switches (e.g., to add a new non-overlapping ring into the switch cluster).

Figure 4:
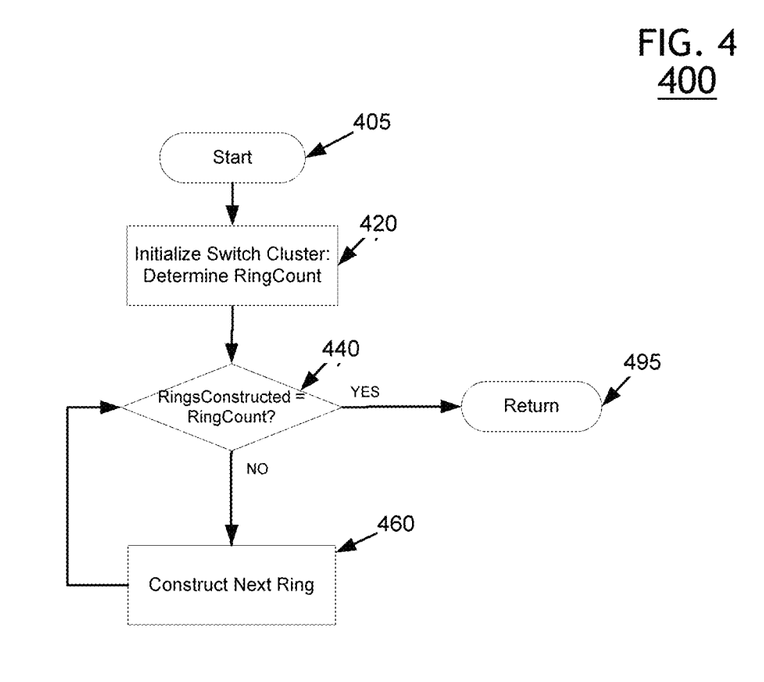
FIG. 4 depicts a flow chart illustrating an embodiment of a method 400 for designing the switch cluster 200B of FIG. 2B.

FIG. 4 depicts a flow chart illustrating an embodiment of a method 400 for designing the switch cluster 200B of FIG. 2B. The method includes initializing the switch cluster (step 420) and constructing "non-overlapping rings" (step 460) based on the initialization in step 420 and a determination that switch cluster construction has not been completed (step 440).

In the method 400, the step 420 includes initializing the switch cluster. In particular, the number of "non-overlapping rings" (i.e., RingCount) is determined. In some embodiments, the first ring is also determined. In some of these embodiments, the first ring constructed would be {1, 2, . . . , k}. Where k is the number of nodes In the method 400, the step 440 includes determining whether construction of the switch cluster is complete. In particular, the apparatus performing the method determines whether the number of constructed rings (i.e., RingsConstructed) equals the RingCount. If RingsConstructed RingCount, then the method proceeds to step 495, else the method proceeds to step 460.

In the method 400, the step 460 includes constructing a new "non-overlapping ring". Upon completion, the method returns to step 440.

In some embodiments of the step 420, the value of Ring-Count is set by a user.

In some embodiments of the step 420, the value of Ring-Count is based on the number of target nodes in the switch cluster. In some of these embodiments, the value of Ring-Count is further based on a performance metric. For example, referring to FIG. 3C, if a ring construction meeting a minimum number of 4-hop node-to-node combinations (e.g., no 4 hop combinations allowed) or meeting a average hop threshold (e.g., less than 2.25) may not be met, the RingCount may be increased (e.g., from 4 to 5 in the example of FIG. 3B).

In some embodiments of the step 420, the value of Ring-Count is based on the equation:

$$\text{RingCount} \leq \text{INT}(k/8+1) \qquad [E.1]$$

Where k is the number of nodes and INT() is a function that returns the integer value of the operation. Advantageously, the restriction [E.1] ensures that the creation of rings without creating duplicate links is possible.

In some embodiments, the switch cluster architecture is modified as a result of network growth. In these embodiments, nodes added to the network may be inserted into the existing switch cluster using the methods described herein. In some of these embodiments, the new node will be inserted in the existing rings one ring at a time, starting with ring 1. In some of these embodiments, for the first ring, the new node may be appended to the end of the ring.

In some embodiments, the method further includes determining shortest paths between nodes. In particular, if the apparatus performing the method determines that the switch cluster has been constructed in step 440, the shortest paths between nodes or hop counts may be computed.

In some embodiments, the apparatus performing the method executes the method multiple times. In some of these embodiments, a predefined threshold count defines the number of times the method will be run. In some of these embodiments, the number of times the method is run is based on a predefined performance threshold (e.g., execute the method until a performance metric threshold is met). In some of these embodiments, the number of times is based on a predefined threshold count or a performance metric threshold (e.g., execute the method until a performance metric threshold is met or a predefined threshold number of runs is met). A performance metric may be any suitable metric such as: (i) hop count (e.g., to minimize an average hop count for the network or to minimize the aggregate maximum hop count between nodes); (ii) access delays; (iii) costs; (iv) customer service level agreements or quality of service constraints (e.g., node to node connections between one or more nodes to resources may be required to be fixed at a lower hop count); (v) resource topology (e.g., resources in one resource rack may preferably be connected to another resource rack via fewer hops); (vi) performance characteristics of the N-hop network (e.g., a strict N-hop network where no node pairs requires more than N hops or an allowed maximum percentage of node pairs that may require >N hops); or (vii) the like. For example, an apparatus performing the method executing the method 1000 times and achieving the results illustrated in FIG. 3B may chose the arrangement with the lowest average hops or the arrangement with the least amount of node-to-node combinations requiring 3 or more hops. In another example, a constraint may be imposed restricting the switch cluster selection to an arrangement where the connections between a specified node and another node meets a minimum hop count (e.g., 1 hop between node 1 and node 7 of FIG. 2B).

In some embodiments, input parameters (e.g., number of rings or number of nodes) or programming parameters (e.g., number of program iterations) may be selected or adjusted. For example, the number of rings may be increased in order to meet a performance characteristic requiring a strict N-hop network.

In some embodiments, the step 460 includes using conventional classical optimization techniques to construct the next ring. Conventional classical optimization techniques involve determining the action that best achieves a desired goal or objective. An action that best achieves a goal or objective may be determined by maximizing or minimizing the value of an objective function. In some embodiments, the goal or metric of the objective function may be to minimize costs or to minimize delays (e.g., to minimize hop counts or access delays).

The problem may be represented as:

Optimizing $$y = f(x_1, x_2, \ldots, x_n) \quad [E.\ 2]$$

Subject to:

$$G_j(x_1, x_2, \ldots, x_n) \begin{Bmatrix} \leq \\ = \\ \geq \end{Bmatrix} b_j \quad [E.\ 3]$$

$$j = 1, 2, \ldots m$$

Where the equation E.2 is the objective function and equation E.3 constitutes the set of constraints imposed on the solution. The $x_i$ variables, $x_1, x_2, \ldots, x_n$, represent the set of decision variables and $y=f(x_1, x_2, \ldots, x_n)$ is the objective function expressed in terms of these decision variables. It should be appreciated that the objective function may be maximized or minimized.

Figure 5:
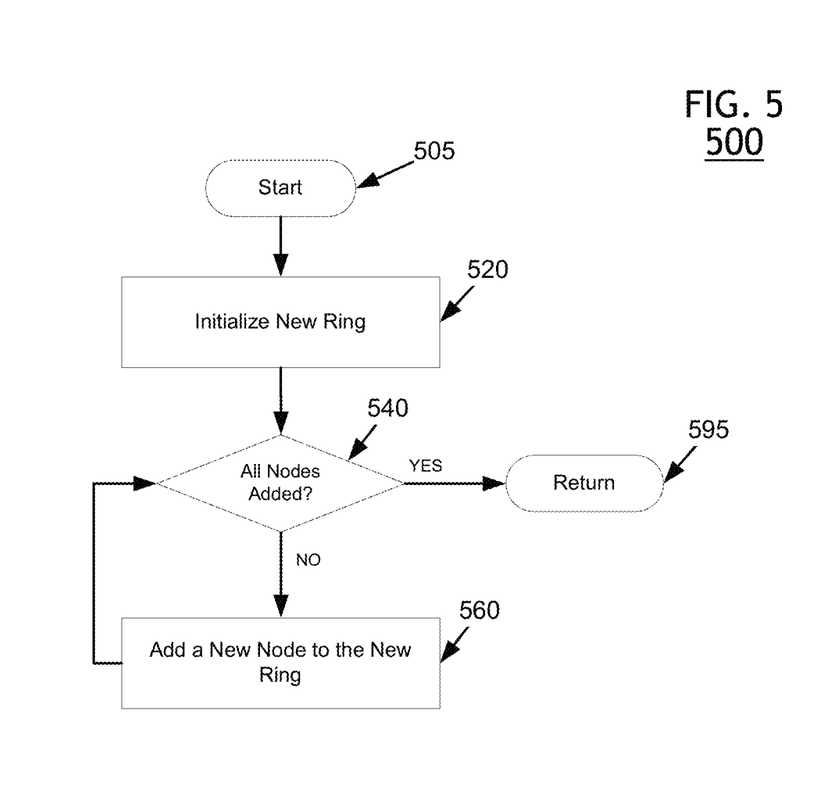
FIG. 5 depicts a flow chart illustrating an embodiment of a method 500 for constructing a new ring as illustrated in step 460 of FIG. 4.

FIG. 5 depicts a flow chart illustrating an embodiment of a method 500 for constructing a new ring as illustrated in step 460 of FIG. 4. The method includes initializing the new ring (step 520) and adding a new node to the ring (step 560) based on the initialization in step 520 and a determination that ring construction has not been completed (step 540).

In the method 500, the step 520 includes initializing the new ring. In particular, a node is selected to create a partially formed ring. In some embodiments, node 1 is selected.

In the method 500, the step 540 includes determining whether construction of the new "non-overlapping ring" is complete. In particular, the apparatus performing the method determines whether all of the nodes have been added to the new ring. If all nodes have been added to the new ring, then the method proceeds to step 595, else the method proceeds to step 560.

In the method 500, the step 560 includes adding a new node to the ring. In particular, the apparatus performing the method ensures that, when inserting or appending a new node to the partial ring, the new links that are created between the newly added node and its neighbor nodes are not a duplicate of a link in any of the previous formed "non-overlapping rings".

In some embodiments of the step 560, nodes are appended until the new node may not be appended (e.g., one or both of the new links would be duplicates in another non-overlapping ring of the switch cluster).

Figure 6:
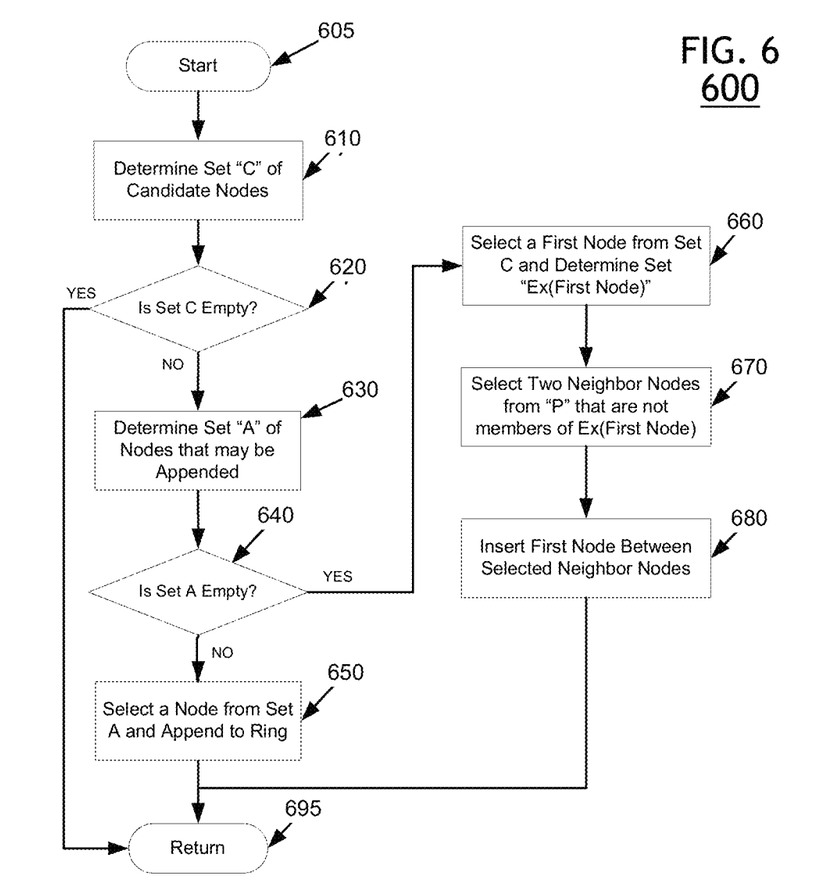
FIG. 6 depicts a flow chart illustrating an embodiment of a method 600 for adding a new node to a new ring as illustrated in step 560 of FIG. 5.

FIG. 6 depicts a flow chart illustrating an embodiment of a method 600 for adding a new node to a new ring as illustrated in step 560 of FIG. 5. The method includes determining a set "C" of candidate nodes (step 5) and determining a set "A" of nodes that may be appended to the partial ring (step 630) based on a determination that candidate nodes are available (step 620). If set "A" is not empty, one of the nodes from set "A" is selected and appended to the ring. If set "A" is empty, the method selects a first node from set "C" and determines an exclusion list "Ex(First Node)" of nodes that the First Node is a neighbor of in other constructed rings (step 660), the method selects two neighbor nodes from a set "P" of nodes in the partial ring under construction that are not members of the set Ex(First Node) (step 670) and the First Node is inserted between the selected neighbor nodes (step 680).

In the method 600, the step 610 includes determining a set "C" of candidate nodes. In particular, set "C" consists of all of the nodes that have not yet been added to the partial ring.

In the method 600, the step 620 includes determining whether set "C" is empty. If set "C" is empty, then the full ring has been constructed and the method proceeds to step 695, else the method proceeds to step 630.

In the method 600, step 630 includes determining a set "A" of nodes that may be appended to the "non-overlapping ring" under construction. In particular, the apparatus performing the method determines the members of set "C" that may be appended to the ring under construction (i.e., the constructed ring would be a "non-overlapping ring").

In the method 600, the step 640 includes determining whether set "A" is empty. If set "A" is empty, then the method proceeds to step 660, else the method proceeds to step 650.

In the method 600, step 650 includes selecting an append node from set "A" and appending the append node to the ring under construction.

In the method 600, the step 660 includes selecting a first node from set "C" and determining a set "Ex(first node)": where Ex( ) is a function taking a TargetNode as an argument and returning a list of nodes that are neighbors to TargetNode in other constructed "non-overlapping rings".

In the method 600, step 670 includes selecting two neighbor nodes from the set "P"—nodes in the partial ring under construction—that are not members of the set Ex(first node).

In the method 600, step 680 includes inserting the first node between the two selected neighbor nodes.

In some embodiments of the step 630, equation [E.4] is used to form set "A".

set "$A$"="$C$"-Ex(FirstNodeInRing)-Ex(LastNodeInRing)  [E.4]

Where "C" is the set of candidate nodes, Ex( ) is a function taking a TargetNode as an argument and returning a list of nodes that are neighbors to TargetNode in other constructed "non-overlapping rings", FirstNodeInRing is the first node in the ring under construction and LastNodeInRing is the last node in the ring under construction.

In some of these embodiments, a second node is selected from the set "P". In some further embodiments, the member nodes of "P" are traversed using the second node as a starting point to find two consecutive nodes that are not members of Ex(first node).

In some embodiments of step 650, 660 or 670, a node is randomly selected. In particular, append node may be randomly selected from set "A" in step 650, first node may be randomly selected from set "C" in step 660, or second node may be randomly selected from set "P" in step 670.

In some embodiments, the steps 630, 640 and 650 may be performed concurrently. In some of these embodiments, a random node in set "C" may be chosen as a starting point to traverse the nodes in the set "C" to determine whether the node may be appended. The apparatus performing the method may stop at the first node which is determined capable of being appended and append that node to the partial ring "P". If no nodes are found after traversing the set "C", then the method may proceed to step 670. In some of these embodiments, steps 610 and 620 may also be performed concurrently. In particular, the complete set "C" may not be constructed before proceeding to step 630 to determine whether a node being added to set "C" may be appended in step 650.

Although primarily depicted and described in a particular sequence, it should be appreciated that the steps shown in methods 300 and 400 may be performed in any suitable sequence. Moreover, the steps identified by one step may also be performed in one or more other steps in the sequence or common actions of more than one step may be performed only once.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Referring back to FIG. 2B, and FIGS. 4-6, an example of constructing a ring and adding a node into the ring under construction is given below.

As illustrated in FIG. 2B, switch cluster 200B includes 17 nodes. We assume that Ring1 and Ring2 are already constructed as illustrated in FIG. 2B and described below The two constructed rings are:

Ring 1={1, 2, 3, 4, 5, 6, 7, 8, 9, 10, 11, 12, 13, 14, 15, 16, 17}

Ring 2={1, 14, 3, 8, 2, 9, 7, 16, 4, 17, 12, 6, 11, 5, 13, 10, 15}

Referring to step 420 of FIG. 4, the apparatus performing the method may determine the RingCount to be 3 using [Eq. 1]: RingCount=INT(17/8+1)=3.

In step 440 of FIG. 4, the apparatus performing the method will determine that a new ring should be constructed and proceed to step 460.

Referring to step 520 of FIG. 5, the apparatus performing the method may initialize the new ring under construction (e.g., Ring 3) by initializing the set "P"—the partial ring—to be {1}. Since there are 17 nodes to be added to Ring 3, all of the nodes have not been added (step 540) and the method proceeds to step 560.

Referring to step 610 of FIG. 6, the apparatus performing the method may then determine the set "C" of candidate nodes. In this example, "C"={2, 3, 4, 5, 6, 7, 8, 9, 10, 11, 12, 13, 14, 15, 16, 17} (i.e., all of the nodes except for those nodes already in set "P", which consists of node 1 at this stage). Since set "C" is not empty (step 620), the apparatus determine the set "A"—nodes that may be appended to set "P". Using Eq.2, set "A" is determined to be {3, 4, 5, 6, 7, 8, 9, 10, 11, 12, 13, 16}. Since set "A" is not empty (step 640), the method proceeds to step 650 and selects a node from set "A" to append to Ring 3. Assume that a random selection from set "A" is done and node 7 is selected. Thus, the partial ring 3 is now {1, 7}.

Returning from FIG. 6 (step 695), the apparatus performing the method determines that all nodes have not been added (step 540 of FIG. 5) and proceeds to step 560 to add another node. Assume now that the apparatus performing the method operates similarly through a number of similar steps until the set "P" is {1, 7, 4, 9, 16, 11, 13, 6, 10, 5, 3, 12, 8} and has returned to step 610 of FIG. 6 to add another node.

Referring to step 610 of FIG. 6, the apparatus performing the method may then determine the set "C" of candidate nodes. At this point in the example, "C"={2, 14, 15, 17} (i.e., the member set of the 17 candidate nodes—nodes that are members of set "P"). Since set "C" is not empty (step 620), the apparatus determines the set "A"—nodes that may be appended to set "P". Using Eq.2, set "A" is determined to be empty. Since set "A" is empty (step 640), the method proceeds to step 660 and selects a node from set "C" and determines Ex(the selected node). Assume that a random selection from set "C" is done and node 14 is selected. For node 14, Ex(14)={1, 3, 13, 15}. The apparatus performing the method proceeds to step 670. In this example, assume that node 11 is randomly selected as a starting point for selecting the two neighbor nodes in "P" that are not members of Ex(14). Traversing the set "P" from node 11 (with wrap around), the apparatus determines that nodes 6 and 10 are neighbor nodes of set "P" that are not in Ex(14). As such, node 14 is inserted between nodes 6 and 10 and set "P" becomes {1, 7, 4, 9, 16, 11, 13, 6, 14, 10, 5, 12, 8}.

Returning from FIG. 6 (step 695), the apparatus performing the method determines that all nodes have not been added (step 540 of FIG. 5) and proceeds to step 560 to add another node. Similar to the above, the apparatus performing the method proceeds until the construction of Ring 3 is completed to yield Ring 3 as illustrated in FIG. 2B—{1, 7, 2, 4, 9, 16, 11, 13, 6, 14, 10, 5, 17, 3, 12, 15, 8}.

Figure 7:
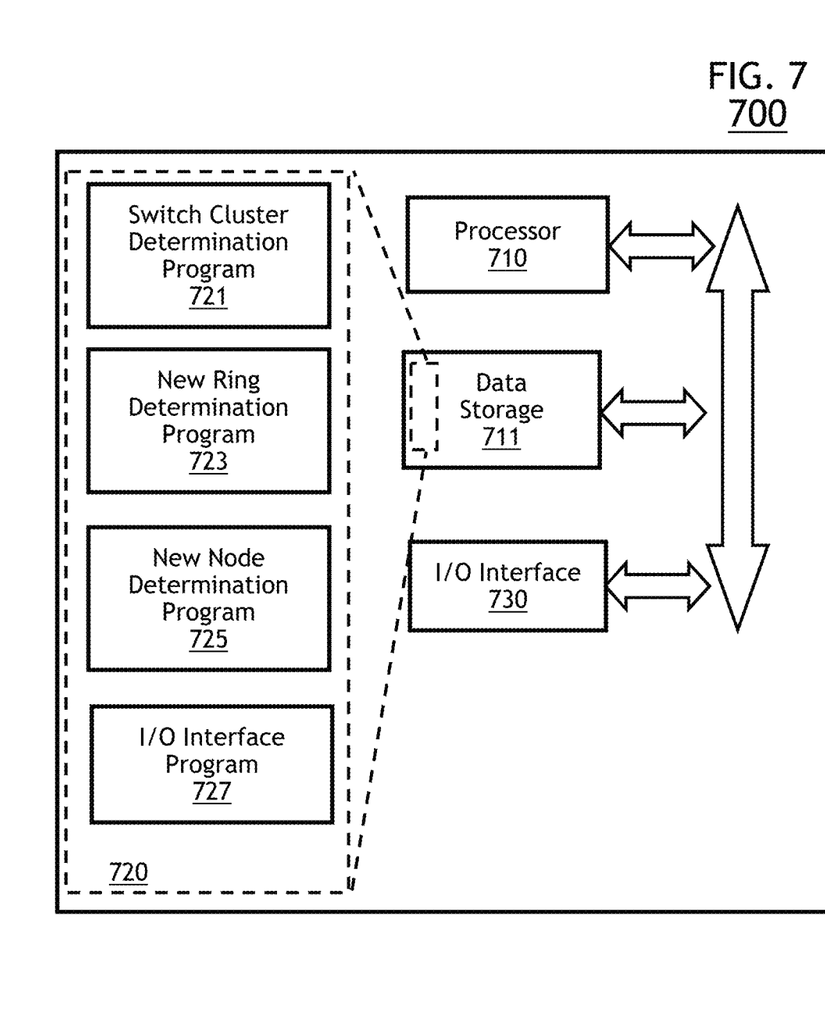
FIG. 7 schematically illustrates an embodiment of various apparatus 700 such as one of the nodes of FIG. 2B or a general purpose computer programmed to perform the methods 400, 500 or 600.

FIG. 7 schematically illustrates an embodiment of various apparatus 700 such as one of the nodes of FIG. 2B or a general purpose computer programmed to perform the methods 400, 500 or 600. The apparatus 700 includes a processor 710, a data storage 711, and optionally an I/O interface 730.

The processor 710 controls the operation of the apparatus 700. The processor 710 cooperates with the data storage 711.

The data storage 711 may store program data such as network topology or the like as appropriate. The data storage 711 also stores programs 720 executable by the processor 710.

The processor-executable programs 720 may include a switch cluster determination program 721, a new ring determination program 723, a new node determination program 725, or optionally an I/O interface program 727. Processor 710 cooperates with processor-executable programs 720.

The I/O interface 730 cooperates with processor 710 and I/O interface program 727 to support communications over any suitable communication channel(s). For example, the I/O interface 730 may be used to communicate the determined switch cluster or a portion thereof to a network management system or to one or more of the nodes of FIG. 2B.

The switch cluster determination program 721 performs the steps of method 400 of FIG. 4 as described above.

The new ring determination program 723 performs the steps of method 500 of FIG. 5 as described above.

The new node determination program 725 performs the steps of method 600 of FIG. 6 as described above.

In some embodiments, the processor 710 may include resources such as processors/CPU cores, the I/O interface 730 may include any suitable network interfaces, or the data storage 711 may include memory or storage devices. Moreover the apparatus 700 may be any suitable physical hardware configuration such as: one or more server(s), blades consisting of components such as processor, memory, network interfaces or storage devices. In some of these embodiments, the apparatus 700 may include cloud network resources that are remote from each other.

In some embodiments, the apparatus 700 may be virtual machine. In some of these embodiments, the virtual machine may include components from different machines or be geographically dispersed. For example, the data storage 711 and the processor 710 may be in two different physical machines.

In some embodiments, the apparatus 700 may be a general purpose computer programmed to perform the methods 400, 500 or 600.

When processor-executable programs 720 are implemented on a processor 710, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for providing a switch cluster, the apparatus comprising:
    a data storage; and
    a processor communicatively connected to the data storage, the processor being configured to:
    determine a set of target nodes;
    determine a RingCount; and
    determine a network architecture based on the set of target nodes and the RingCount, the network architecture comprises the set of target nodes communicatively connected to form a plurality of rings equal to the RingCount;
    wherein each of the plurality of rings comprise the set of target nodes; and
    wherein no link between any two nodes in any ring is duplicated in any of the other rings.

2. The apparatus of claim 1, wherein the RingCount is based on a number of members in the set of target nodes.

3. The apparatus of claim 2, wherein the RingCount is based on a performance metric.

4. The apparatus of claim 1, wherein the determination of the network architecture comprises configuring the processor to:
    determine a plurality of candidate network architectures based on the set of target nodes and the RingCount; and
    select one of the plurality of candidate network architectures as the network architecture based on a performance metric.

5. The apparatus of claim 4, wherein the performance metric is at least one of an average hop count and a maximum hop-count.

6. The apparatus of claim 1, wherein the determination of the network architecture comprises configuring the processor to:
    construct a new non-overlapping ring based on at least one other non-overlapping ring;
    wherein the plurality of non-overlapping rings comprises the new non-overlapping ring and the at least one other non-overlapping ring.

7. The apparatus of claim 6, wherein the construction of the new non-overlapping ring comprises configuring the processor to:
    initialize a partial non-overlapping ring with a first of the target nodes;
    append a second of the target nodes to the partial non-overlapping ring based on a determination that the connection between the second target node and the neighbor target nodes of the second target node in the partial non-overlapping ring is not duplicated in the at least one other non-overlapping ring; and
    insert a third of the target nodes to the partial non-overlapping ring based on a determination that the connection between the third target node and the neighbor target nodes of the third target node in the partial non-overlapping ring is not duplicated in the at least one other non-overlapping ring.

8. The apparatus of claim 7, wherein the second target node is selected randomly from a subset of the target nodes, the subset comprising the members of the target nodes that are not in the partial non-overlapping ring such that connections with the first node and the last node in the partial non-overlapping ring are not duplicated in the at least one other non-overlapping ring.

9. The apparatus of claim 7, wherein the insertion of the third target node is based on a determination that none of the target nodes remaining to be added to the partial non-overlapping ring may be appended to the partial non-overlapping ring.

10. The apparatus of claim 1, wherein the determination of the network architecture is further based on at least one of a customer service level agreement or a quality of service constraint.

11. A system for switching data, the system comprising:
a switch cluster comprising:
a plurality of nodes communicatively connected to form a plurality rings;
wherein each of the plurality of rings comprise the set of target nodes; and
wherein no link between any two nodes in any ring is duplicated in any of the other rings.

12. The system of claim 11, wherein the switch cluster provides substantially a 3-hop network.

13. The system of claim 11, further comprising:
a second switch cluster communicatively connected to the switch cluster, the second switch cluster comprising:
a second plurality of nodes communicatively connected to form a second plurality of non-overlapping rings.

14. The system of claim 11, further comprising:
a second switch cluster communicatively connected to the switch cluster, the second switch cluster comprising:
a second plurality of nodes communicatively connected to form a full mesh topology.

15. A method for providing a switch cluster, the method comprising:
at a processor communicatively connected to a data storage, determining a set of target nodes;
determining, by the processor in cooperation with the data storage, a RingCount; and
determining, by the processor in cooperation with the data storage, a network architecture based on the set of target nodes and the RingCount, the network architecture comprises the set of target nodes communicatively connected to form a plurality of rings equal to the RingCount;
wherein each of the plurality of rings comprise the set of target nodes; and
wherein no link between any two nodes in any ring is duplicated in any of the other rings.

16. The method of claim 15, further comprising:
adding, by the processor in cooperation with the data storage, a new ring to the network architecture based on a network growth threshold.

17. The method of claim 16, wherein the step of adding the new ring comprises redirecting a port on a first of the target nodes to communicatively connect the first target node with a second of the target nodes.

18. The method of claim 15, wherein the RingCount is based on a performance metric.

19. The method of claim 15, wherein the step of determining of the network architecture comprises:
constructing, by the processor in cooperation with the data storage, a new non-overlapping ring based on at least one other non-overlapping ring;
wherein the plurality of non-overlapping rings comprises the new non-overlapping ring and the at least one other non-overlapping ring.

20. The apparatus of claim 15, wherein the determination of the network architecture is further based on at least one of a customer service level agreement or a quality of service constraint.

* * * * *